(12) United States Patent
David et al.

(10) Patent No.: US 9,670,063 B2
(45) Date of Patent: Jun. 6, 2017

(54) METHOD FOR PRODUCING HYDROGEN FROM AMMONIA

(71) Applicant: THE SCIENCE AND TECHNOLOGY FACILITIES COUNCIL, Didcot, Oxfordshire (GB)

(72) Inventors: William I. F. David, Didcot (GB); Martin Owen Jones, Didcot (GB)

(73) Assignee: The Science and Technology Facilities Council, Oxfordshire (GB)

( * ) Notice: Subject to any disclaimer, the term of this patent is extended or adjusted under 35 U.S.C. 154(b) by 158 days.

(21) Appl. No.: 14/351,453

(22) PCT Filed: Oct. 22, 2012

(86) PCT No.: PCT/GB2012/000808
§ 371 (c)(1),
(2) Date: Apr. 11, 2014

(87) PCT Pub. No.: WO2013/057473
PCT Pub. Date: Apr. 25, 2013

(65) Prior Publication Data
US 2015/0344302 A1    Dec. 3, 2015

(30) Foreign Application Priority Data

Oct. 21, 2011  (GB) .................................. 1118211.0
May 21, 2012  (GB) .................................. 1208922.3

(51) Int. Cl.
*C01B 3/06*  (2006.01)
*C01B 3/08*  (2006.01)
(Continued)

(52) U.S. Cl.
CPC .................. *C01B 3/08* (2013.01); *B01J 19/24* (2013.01); *B01J 19/245* (2013.01); *C01B 3/047* (2013.01); *C01B 21/0923* (2013.01); *B01J 2219/24* (2013.01); *Y02E 60/364* (2013.01)

(58) Field of Classification Search
CPC ...... C01B 3/08; C01B 21/0923; B01J 19/245; B01J 19/24; B01J 2219/24; Y02E 60/364
See application file for complete search history.

(56) References Cited

U.S. PATENT DOCUMENTS 1,646,372 A * 10/1927 Wait ......................... C01B 3/08
                                                        423/413
2,163,100 A    6/1939 Miller et al.
(Continued)

FOREIGN PATENT DOCUMENTS

CN    1944258 A    4/2007
GB     25891 A    0/1912
(Continued)

OTHER PUBLICATIONS

David et al. "Hydrogen Production from Ammonia Using Sodium Amide" J. Am. Chem. Soc. 2014, 136, 13082-13085.*
(Continued)

*Primary Examiner* — Anthony J Zimmer
*Assistant Examiner* — Syed Iqbal
(74) *Attorney, Agent, or Firm* — Birch, Stewart, Kolasch & Birch, LLP

(57) ABSTRACT

The present invention relates to a method of producing hydrogen from ammonia, and in particular a method of producing hydrogen from ammonia by reacting it with a Group I metal, particularly with sodium, for use in a fuel cell and/or in a prime mover. The method may be carried out in-situ in a vehicle. The invention also relates to an apparatus for producing hydrogen from ammonia.

16 Claims, 14 Drawing Sheets

Figure 1:
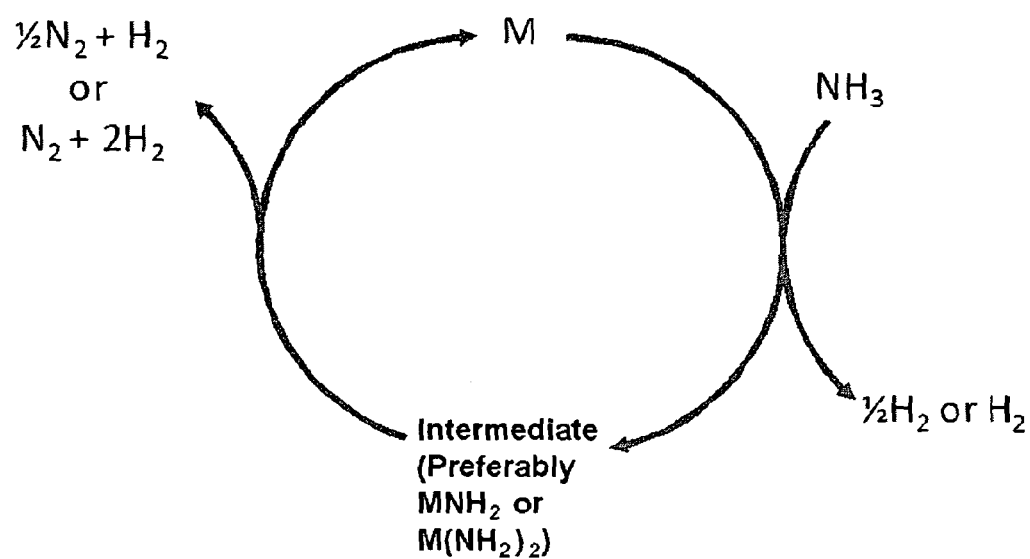

(51) Int. Cl.
  *B01J 19/24* (2006.01)
  *C01B 21/092* (2006.01)
  *C01B 3/04* (2006.01)

(56) References Cited

U.S. PATENT DOCUMENTS

| | | | |
|---|---|---|---|
| 4,206,191 A | 6/1980 | Morrison et al. | |
| 7,640,896 B2 * | 1/2010 | Nazri | C01B 3/047 |
| | | | 123/198 A |
| 2011/0008694 A1 | 1/2011 | Tange et al. | |

FOREIGN PATENT DOCUMENTS

| | | |
|---|---|---|
| JP | 2009534285 A | 9/2009 |
| JP | 2009221086 A | 10/2009 |
| JP | 2010215469 A | 9/2010 |
| WO | WO 2005/005310 A2 | 1/2005 |
| WO | WO 2009/116679 A1 | 9/2009 |

OTHER PUBLICATIONS

Yin et al. Magnesia-carbon nanotubes (MgO-CNTs) nanocomposite: novel support of Ru catalyst for the generation of COx-free hydrogen from ammonia, Catalysis Letters vol. 96, No. 3-4, Jul. 2004.*

A. Kotowski and the Gmelin Institute: "Gmelins Handbuch Der Anorganischen Chemie 8, Auflage; Natrium Ergangzungsband, Lieferung 3 (System-Nummer 21)," Jan. 12, 1996, Verlag Chemie GMBH, Weinheim, Germany, pp. 917, 922 and 947, XP002689850.

XLV.—Sodium, Potassium, and Lithium Amides, by Arthur W. Titherley, B.Sc., Published on Jan. 1, 1894. pp. 504-522.

* cited by examiner

METHOD FOR PRODUCING HYDROGEN FROM AMMONIA

The present invention relates to a method of producing hydrogen from ammonia, and in particular a method of producing hydrogen from ammonia for use in a fuel cell and/or in a prime mover. The method may be carried out in-situ in a vehicle. The invention also relates to an apparatus for producing hydrogen from ammonia.

While the precise timescales about the future of energy provision from oil, coal and gas are uncertain and strongly debated, it is unsustainable that fossil fuels can be relied on as sources of energy. Fossil fuels are currently being consumed at a rate that is in excess of a million times faster than their formation. It is also clear that the amount of carbon dioxide released into the atmosphere has a significant and man-made component.

Transportation is one of the principal energy sectors and depends almost entirely on fossil fuels for energy provision. It is recognised that a move from petrol and diesel to liquid petroleum (LPG) and then to compressed natural gas (CNG) will result in lower $CO_2$ emissions. The two main technologies which may replace the internal combustion engine over the first half of this century are batteries and fuel cells. The move away from a solely fossil-fuel system for transportation has already begun and gasoline/diesel-battery hybrids now form a small, but increasing component of the car market.

Hydrogen storage is one of the main scientific and technological challenges in the move towards the mass production of hydrogen fuel-cell electric vehicles and for the move towards a low-carbon economy. Multiple criteria must be satisfied: storage must not only be lightweight and compact, but also safe, inexpensive, long-range and, ideally, rapidly refuellable.

Significant issues have arisen in the search for improved solid-state hydrogen storage materials; for example, facile reversibility has been a major challenge for many complex hydrides studies, whilst physisorption in porous structures is still restricted to cryogenic temperatures. Although there has been a very significant research effort in solid-state hydrogen storage, high pressure gas storage combined with conventional metal hydrides is still seen as the current intermediate-term candidate for car manufacturers.

On-site generation of hydrogen has been considered for use in a fuel cell. The hydrogen may be formed, for example, from methanol and/or methane. However, hydrogen formation from methanol and/or methane inevitably leads to carbon dioxide and/or carbon monoxide emissions. Hydrogen formation from methanol and/or methane has other associated disadvantages such as the requirement for secondary tanks of water and coking of reformation catalysts.

It is one object of the present invention to overcome or address the problems of prior art hydrogen storage and hydrogen production for use in a fuel cell or in a prime mover or to at least provide a commercially useful alternative thereto. It is an alternative and/or additional object to provide a method and apparatus for producing hydrogen for use in a fuel cell or in a prime mover which is cheaper to make and/or more effective than known methods.

In the first aspect of the present invention there is provided a method of producing hydrogen from ammonia the method comprising:
(i) providing ammonia as a fuel source;
(ii) introducing ammonia into a reactor and reacting at least some of the ammonia with a metal and/or a metal-containing-compound to form at least one intermediate and optionally hydrogen;
(iii) decomposing at least some of the intermediate produced in step (ii) to form hydrogen and to regenerate the metal and/or the metal-containing-compound;
(iv) removing at least some of the hydrogen formed in step (iii); and
(v) reacting the regenerated metal and/or the regenerated metal-containing-compound with further ammonia.

In the second aspect of the present invention there is provided an apparatus for producing hydrogen from ammonia, the apparatus comprising:
a reactor containing metal and/or a metal-containing-compound;
a fuel source reservoir containing ammonia as a fuel;
a flowline connecting the reservoir to the reactor for introducing the fuel into the reactor;
an energy source coupled to the reactor arranged to input energy into the reactor in order to produce decomposition of intermediate formed in the reactor by reaction of the metal and/or a metal-containing-compound with ammonia; and
a hydrogen outlet from the reactor for removing hydrogen from the reactor.

The present invention will now be further described. In the following passages different aspects of the invention are defined in more detail. Each aspect so defined may be combined with any other aspect or aspects unless clearly indicated to the contrary. In particular any feature indicated as being preferred or advantageous may be combined with any other feature or features indicated as being preferred or advantageous.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

The method and apparatus described herein uses ammonia, which is preferably in the gaseous and/or liquid state as a fuel source and in particular as a source of hydrogen. Ammonia has a number of favourable attributes for use as a hydrogen storage material. It has a high capacity for hydrogen storage, 17.65 wt % based on its molecular structure. It can be liquefied under mild conditions. The vapour pressure of ammonia at room temperature is 9.2 bar and its physical properties are similar to propane. However, to date, several considerations have prevented its successful use in hydrogen production in vehicles on a commercial scale. These considerations include safety and toxicity issues, both actual and perceived. Moreover, in order to release hydrogen from ammonia, significant energy input is required. Thus, to date there has not been a commercially useful method and/or apparatus for exploiting ammonia as a fuel source in the production of hydrogen.

The present inventors have, however, developed a method of producing hydrogen from ammonia which involves the reaction of ammonia with a metal and/or metal-containing-compound to form at least one intermediate and optionally hydrogen. The intermediate is then decomposed to form hydrogen and to regenerate the metal and/or metal-containing-compound. The regenerated metal and/or metal-containing-compound is then reacted with further ammonia. In this way, the metal and/or the metal-containing-compound can be recycled through the process enabling further ammonia to be converted to hydrogen. Preferably, the metal and/or metal containing compound is a reactant which reacts with ammonia to form an intermediate and it does not simply act as a catalyst.

Preferably, the intermediate formed is a stable, isolatable intermediate. In one embodiment, the intermediate is decomposed in a first reactor in which it is formed and it is not transferred to a second reactor. In an alternative embodiment, the intermediate can be transferred from a first reactor to a second reactor without significant decomposition of the intermediate. As used herein "without significant decomposition" means that preferably the composition of the intermediate does not significantly change, or does not change, whilst transferring the intermediate from the first to the second reactor. Preferably less than 5% or less than 1% by weight of the intermediate decomposes during the transfer based on the total weight of the intermediate transferred.

Preferably, the intermediate is not an ammonia-metal coordinated complex, or ammonia sorbed onto the surface of the metal and/or metal-containing compound. Preferably, the intermediate formed is a chemical compound, preferably an ionic or covalently bound compound. As outlined above, preferably, the metal and/or metal containing compound is a reactant which reacts with ammonia to form an intermediate and it does not simply act as a catalyst.

Preferably the intermediate of the present invention is formed via a thermodynamically favourable process. For example:

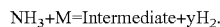

$NH_3 + M = Intermediate + yH_2.$

Preferably the intermediate formed is a metal amide. y will depend on the nature of the intermediate formed. If M is Na, and $NaNH_2$ is formed, $\Delta H = -77/9$ kJmol$^{-1}$, $\Delta S = -101.9$ Jmol$^{-1}$K$^{-1}$.

One advantage of this system is that formation of the intermediate compound is thermodynamically spontaneous. Moreover, decomposition of the intermediate compound forms the reactant metal and/or metal-containing compound M. The enthalpy of the formation of the intermediate may be used to promote the decomposition of the intermediate to form $H_2$. When the intermediate is $NaNH_2$ decomposition forms $0.5N_2$, $H_2$ and Na or $0.5N_2$, $0.5H_2$ and NaH.

Utilising the hydrogen evolved in the formation of the intermediate (which is preferably a metal amide) preferably produces between 120-240 kJ/mol, for example in a PEM fuel cell. This energy is sufficient to induce the decomposition of the intermediate, which preferably is sodium amide. The 'net' hydrogen energy evolution (defined as total hydrogen energy—hydrogen energy required for material decomposition) for such a system is thus $1.0H_2$/mol intermediate (preferably a metal amide, most preferably sodium amide) (or $1.0H_2$/mol per mol $NH_3$), equivalent to a usable hydrogen storage capacity of ~11.7 wt % hydrogen. For a complete system, estimating ancillary reactor and storage container weights of 20 kg and an 80l tank of ammonia containing 54.5 kg of liquid ammonia, the usable hydrogen storage capacity is 8.6 wt % (for 30 kg of ancillary reactor and containers the system density is 7.6 wt % $H_2$, 6.8 wt % at 40 kg and 6.1 wt % at 50 kg). This is considerably better than all solid state hydrogen storage systems suggested thus far, the vast majority of which do not exceed these system hydrogen densities when considering gross hydrogen densities, let alone for net hydrogen densities. A further advantage of the invention described is that it may be rapidly and easily refuelled with liquid or gaseous ammonia.

Most preferably the intermediate is a metal amide. Preferably the metal amide is stable and isolatable from the reactor. However, the metal amide formed may be very transient, and only exist for fractions of seconds, seconds, minutes or longer before decomposing at the given reaction conditions.

Preferably, the metal amide formed is a primary amide of formula $MNH_2$, $M(NH_2)_2$, $M(NH_2)_3$ or $M(NH_2)_4$ when the cation is $M^+$, $M^{2+}$, $M^{3+}$ and $M^{4+}$ respectively. Preferably the metal amide does not decompose under the reaction conditions in the reactor to form an imide. Preferably, the metal amide decomposes or can be made to decompose to nitrogen gas and hydrogen gas and metal M.

Preferably, the decomposition of the intermediate formed in step (ii) is in the absence of additional hydrogen. "Additional hydrogen" means hydrogen which is not generated in the reaction of ammonia with the metal and/or metal-containing-compound or in the decomposition of the intermediate formed by said reaction.

Preferably the method described herein is carried out in-situ in a vehicle. Preferably, it is carried out in a hybrid vehicle.

Advantageously, the invention relates to a method of cracking ammonia at temperatures that are lower than those currently employed in the industry, preferably with a cheaper activating agent which preferably does not poison with time. In one embodiment, the invention relates to a method wherein hydrogen is provided at the point of use. Alternatively, and/or additionally, hydrogen may be produced at a site remote from use and optionally said hydrogen may be introduced into a distributed network.

The term 'distributed network' may refer to a power network which is connected to at least one distributed generation plant or a distributed energy resource system. The distributed generation plants and/or distributed energy resource systems may be small-scale power generation facilities which may generate in the range of from 3 kW to 10,000 kW of power and may be used to provide an alternative to and/or an enhancement of a traditional electric power system.

The method described herein may further comprise introducing at least some of the hydrogen removed into a transport and/or storage means. The storage means may comprise any suitable container, for example, a cylinder. The transport means may comprise a pipe or network for delivery of the hydrogen, for example, to a desired end point.

Preferably the method described herein is carried out in conjunction with a fuel cell and/or prime mover and/or combustion engine, preferably an ammonia internal combustion engine, for any application including heat and power applications, backup generator electricity, consumer electronics and large scale high demand electricity users. Preferably the method provides a means of providing hydrogen at source from ammonia for any application requiring hydrogen including applications in chemical industry, semiconductor industry, petrochemical industry, petroleum industry, energy industry or any process that utilises or requires hydrogen gas where hydrogen is stored as ammonia and converted to hydrogen as required.

Preferably the method described herein is carried out in conjunction with a fuel cell or prime mover or combustion engine, preferably an ammonia internal combustion engine, for any application including the delivery of hydrogen to a fuel cell to provide electricity for systems not connected or disconnected from the national grid, including rural and/or isolated applications such as street lighting, traffic lights, backup power supplies and for heat and power provision for domestic applications such as household appliances. In one embodiment, the backup power supplies are for use in hospitals or data centres. Suitable household appliances include boilers, ovens, refrigerators, washing machines, dishwashers, lighting and computers.

Preferably the method described herein may provide continuous generation of hydrogen in large quantities where hydrogen supply is essential and/or where delivery to and storage of ammonia in industrial locations is possible and subsequent conversion or partial conversion of ammonia to hydrogen may be undertaken in order to ensure high hydrogen capacity on-site.

Preferably, the method described herein further comprises introducing the removed hydrogen and/or partially converted ammonia into a fuel cell or a prime mover or a combustion engine, preferably an ammonia internal combustion engine. Optionally the removed hydrogen may be passed through a filter to remove any ammonia present. The filter may comprise a group 1, group 2, and/or transition metal halide and/or a group 1, group 2, and/or transition metal borohydride and/or a solid state ammonia/hydrogen filter. Optionally, the hydrogen and ammonia may be separated by physical methods of separation, for example by changing the temperature and/or the pressure. Suitable materials may be selected and tailored depending on the temperature of operation, mass, filter capacity and/or efficiency. Optionally the removed hydrogen may be circulated through the reactor to increase the ammonia conversion rate, passed through additional reactors in series or parallel to enhance ammonia conversion and/or hydrogen purity and/or to achieve specifically desired ammonia:hydrogen ratios for combustion, fuel cell, prime mover, chemical or other purposes (see above).

The hydrogen produced in the present invention may be used in any suitable fuel cell, for example in a PEM (proton exchange membrane) fuel cell or other fuel cell known in the art. Partially converted ammonia may be used in a fuel cell or a prime mover or a combustion engine, preferably an ammonia internal combustion engine.

The method described herein may further comprise combusting the removed hydrogen. For example the removed hydrogen may be combusted directly in a suitably modified internal combustion engine, or utilised with ammonia in an ammonia internal combustion engine.

Ammonia is provided as a fuel source. Ammonia may be provided in a gaseous and/or liquid state. Suitable conditions for storing liquid and gaseous ammonia are known in the art. Typically the ammonia will be anhydrous. Ammonia may be stored under pressure, cryogenically and/or in a solid state store. The ammonia may be stored in a remote reservoir and transferred into the reactor either as a liquid, for example as a pressurised liquid, or a gas, for example a high pressure gas. When stored as a pressurised gas, preferably the ammonia is stored at from 0.1 to 10 MPa. Ammonia may be introduced into the reactor by injection, pumping, spraying and/or by mechanical means. Preferably the ammonia is introduced by spraying means. Ammonia may be introduced directly into the molten metal M and/or bubbled through the molten metal M. Preferably ammonia is introduced as a heated gas.

Preferably, ammonia is introduced into the reactor at a temperature in the range of from −30 to 800° C., more preferably from 100 to 700° C., or from 200 to 600° C., preferably from 350 to 500° C., or from 150 to 500° C., more preferably from 220 to 450° C., most preferably from 250 to 450° C. The kinetics of the reaction to form the intermediate and the decomposition of the same may be influenced by temperature. Introducing ammonia at a higher temperature, for example above 350° C. or 500° C., may prevent cooling of the reaction by the incoming gas which may affect the kinetics of the reaction and decomposition of the intermediate.

Preferably, ammonia is introduced into the reactor at a pressure in the range of from 0.01 to 100 MPa, more preferably in the range of from 0.1 to 100 MPa, more preferably in the range of from 0.1 to 50 MPa, or from 1 to 50 MPa, more preferably still in the range of from 5 to 30 MPa or from 0.1 to 30 MPa, most preferably in the range of from 10 to 20 MPa. The kinetics of the reaction to form the intermediate and the decomposition of the same may be influenced by pressure. Introducing ammonia at a higher pressure, for example above 10 MPa, or above 20 MPa, may increase or decrease the rate of the reaction and decomposition.

Ammonia may be introduced into the reactor continuously whilst the reactor is in operation (i.e. whilst the reactor is being used to react at least some of the ammonia with a metal and/or metal-containing compound to form at least one intermediate and optionally hydrogen). Ammonia may be introduced into the reactor in a continuous, semi-continuous or in a batch process. Valves and/or controlling means may be used to control the amount of ammonia introduced into the reactor and/or to analyse the amount of ammonia present in the reactor. The controlling means may comprise volumetric or mass flow controllers. Ammonia in the outflow gas may be determined by colour change filter, spectroscopically, electronically, by mass spectroscopy or by mass change (of filter). Valves for fixed volume/mass addition are available commercially.

Preferably, the reactor has a volume in the range of from 0.01 $cm^3$ to 10,000 liters depending upon the application and conversion rate of ammonia required. Multiple reactors of similar or differing volumes may be used in series or parallel to provide pure hydrogen from ammonia conversion or a mixed ammonia/hydrogen gas of variable composition.

Preferably the reactor has a volume range of from 0.01 to 10,000 $cm^3$, more preferably from 0.1 $cm^3$ to 1,000 $cm^3$, more preferably in the range of from 1 $cm^3$ to 200 $cm^3$ or from 10 $cm^3$ to 300 $cm^3$, most preferably in the range of from 10 $cm^3$ to 100 $cm^3$ or from 20 $cm^3$ to 100 $cm^3$, especially for vehicle applications.

The method described herein preferably further comprises refuelling the ammonia fuel source. The ammonia fuel source may be kept in a remote reservoir from where it may be introduced into the reactor. The remote reservoir preferably has a flowline to the reactor for introducing the ammonia into the reactor. One advantage of using ammonia as a fuel source is that refuelling may be carried out quickly (at a similar speed to refuelling a fuel tank with petroleum or diesel). Using ammonia as a fuel source allows on-board refuelling to take place. Moreover, ammonia may be provided at refuelling stations in a similar way to how petroleum and/or diesel is provided today. This has many advantages over other known methods of refuelling alternative energy sources. For example recharging of electric batteries is time consuming and requires specialist equipment which is separate to the vehicle. This is clearly disadvantageous for consumers. Thus the present method/apparatus has improved consumer acceptability.

The metal and/or metal-containing-compound may comprise or be selected from the group consisting of Group I metals, Group II metals, transition metals, p-block metals, lanthanide metals, alloys and mixtures or two or more thereof.

The metal and/or metal-containing-compound may comprise one or more of Group I metals, Group II metals, transition metals, p-block metals, lanthanide metals, alloys and mixtures or combinations of two or more thereof.

The Group 1 metal may be selected from the group consisting of Na, Li, K, Rb, Cs, alloys and mixtures of two or more thereof. Preferably, the Group I metal is Na. Sodium is particularly preferred because, upon reaction with ammonia sodium amide may be formed. Without wishing to be bound by any particular theory, it is thought that sodium amide will not decompose to form an imide, instead it decomposes to nitrogen gas, hydrogen gas and the sodium metal or to nitrogen gas, hydrogen gas and the sodium hydride.

The Group 1 metal may comprise one or more of Na, Li, K, Rb, and Cs. The one or more metals may be present in form of metals, alloys, ions, mixtures or combinations of two or more thereof.

The Group 2 metal may be selected from the group consisting of Be, Mg, Ca, Sr, Ba, alloys and mixtures of two or more thereof. Preferably, the Group 2 metal is Mg.

The Group 2 metal may comprise one or more of Be, Mg, Ca, Sr and Ba. The one or more metals may be present in form of metals, alloys, ions, mixtures or combinations of two or more thereof.

The transition metal may be selected from the group consisting of Sc, Y, Ti, V, Cr, Mn, Fe, Co, Ni Cu, Zn, Zr, Nb, Mo, Tc, Ru, Rh, Pd, Ag, Cd, Hf, Ta, W, Re, Os, Ir, Pt, Au, Hg, alloys and mixtures of two or more thereof. Preferably, the transition metal is Hg or Ag.

The transition metal may comprise one or more of Sc, Y, Ti, V, Cr, Mn, Fe, Co, Ni Cu, Zn, Zr, Nb, Mo, Tc, Ru, Rh, Pd, Ag, Cd, Hf, Ta, W, Re, Os, Ir, Pt, Au and Hg. The one or more metals may be present in form of metals, alloys, ions, mixtures or combinations of two or more thereof.

The lanthanide metal may be selected from the group consisting of La, Ce, Pr, Nd, Pm, Sm, Eu, Gd, Tb, Dy, Ho, Er, Tm, Yb, Lu, alloys and mixtures of two or more thereof. Preferably, the lanthanide metal is Eu or Lu.

The lanthanide metal may comprise one or more of La, Ce, Pr, Nd, Pm, Sm, Eu, Gd, Tb, Dy, Ho, Er, Tm, Yb and Lu. The one or more metals may be present in form of metals, alloys, ions, mixtures or combinations of two or more thereof.

Preferably, the metal-containing-compound is selected from the group consisting of metal hydrides, metal nitrides, metal imides and mixtures or combinations of two or more thereof. Without wishing to be bound by any particular theory, these compounds are preferred because they react dynamically with ammonia to form an intermediate amide.

Preferably, the metal-containing-compound may comprise one or more of metal hydrides, metal nitrides, metal imides and mixtures or combinations of two or more thereof.

The metal and/or metal-containing-compound may be stored prior to introduction into the reactor and/or provided as a solid, liquid, or dispersed state. The metal and/or metal-containing-compound may be dispersed in a solvent, for example liquid ammonia. Alternatively and/or additionally the metal and/or metal-containing-compound may be stored and/or provided dispersed in a solid state host (for example a mesoporous solid).

The metal and/or metal-containing-compound may be molten under reaction conditions.

Preferably the metal and/or metal-containing-compound is present in an amount of from 1 g to 10 kg, more preferably from 10 g to 8 kg, or from 50 g to 7 kg, most preferably from 100 g to 2 kg. Preferably the metal is present in an amount of 10 kg or less, more preferably of 8 kg or less.

The reaction of the at least some ammonia with a metal and/or metal-containing-compound to form at least one intermediate may occur in the absence of a catalyst. For example, the reaction of the at least some ammonia with a metal and/or metal-containing-compound to form at least one intermediate may occur spontaneously under the reaction conditions present in the reactor.

Preferably, the reaction of the at least some ammonia with a metal and/or metal-containing-compound to form at least one intermediate is carried out in the presence of a catalyst.

The catalyst may comprise one or more transition metals, lanthanide metals and mixtures thereof.

Preferably, the catalyst is selected from the group consisting of transition metal calogenides, lanthanide metal calogenides, transition metal halides, lanthanide metal halides, transition metal pnictides, lanthanide metal pnictides, transition metal tetrels, lanthanide metal tetrels and mixtures of two or more thereof.

The catalyst may be dissolved and/or dispersed in the liquid metal and/or metal-containing compound; dispersed with, or without the metal and/or metal-containing compound in a host media; dissolved and/or dispersed in the liquid in ammonia, optionally as a slurry, emulsion or other mixture. The catalyst may be stored in a remote reservoir and introduced into the reactor. The remote reservoir preferably has a flowline to the reactor for introducing the catalyst into the reactor. The catalyst may be introduced into the reactor by injection, pumping, spraying and/or by mechanical means. Alternatively and/or additionally the catalyst may be provided in the reactor.

Preferably the catalyst is introduced into the reactor such that the mass ratio of catalyst to metal and/or metal-containing-compound is in the range of from 1:1,000,000 to 1:2, more preferably in the range of from 1:100,000 to 1:10,000.

Preferably the catalyst will be present in an amount of from 1 µg to 10 g, more preferably in an amount of from 500 µg to 8 g, more preferably in an amount from 1 mg to 7 g, most preferably in an amount from 2 mg to 6 g.

Preferably, the at least some ammonia is introduced into the reactor such that the molar ratio of ammonia to metal and/or metal-containing-compound is in the range of from 1:1 to 1:2, more preferably in the range of from 1:1.1 to 1:1.9, more preferably in the range of from 1:1.2 to 1:1.8, more preferably in the range of from 1:1.3 to 1:1.7, most preferably in the range of from 1:1.4 to 1:1.6. The molar ratio of ammonia to metal and/or metal-containing-compound in the reactor may be 1:1.5. Preferably the at least some ammonia is introduced into the reactor such that there is an excess of metal and/or metal-containing-compound to minimise up-stream ammonia loss.

The reaction of the at least some ammonia with the metal and/or the metal-containing-compound to form the at least one intermediate may be carried out at a temperature in the range of from −30 to 800° C. Preferably, the reaction of the at least some ammonia with the metal and/or the metal-containing-compound to form the at least one intermediate may be carried out at a temperature in the range of from 100 to 800° C., or 150 to 600° C., or 200 to 600° C. Most preferably the reaction of the at least some ammonia with the metal and/or the metal-containing-compound to form the at least one intermediate is carried out at a temperature in the range of from 150 to 500° C., more preferably from 220 to 450° C. or from 250 to 450° C. or from 350 to 500° C.

Preferably, the reaction of the at least some ammonia with a metal to form the at least one intermediate is carried out at a pressure in the range of from 0.01 to 100 MPa, or 0.01 to 50 MPa, or 0.1 to 50 MPa, or 1 to 50 MPa. More preferably, the reaction of the at least some ammonia with a metal to form the at least one intermediate is carried out at a pressure in the range of from 0.1 to 30 MPa, or from 5 to 30 MPa, most preferably in the range of from 0.1 to 20 MPa, or from 10 to 20 MPa The method described herein may also comprise the step of introducing the metal and/or the metal-containing-compound and/or a precursor thereof into the reactor.

As outlined above, in the method described herein the metal and/or the metal-containing-compound reacts with ammonia to form at least one intermediate and optionally hydrogen. The intermediate is then decomposed to form hydrogen and to regenerate the metal and/or metal-containing-compound. The regenerated metal and/or metal-containing-compound is then reacted with further ammonia. In this way, the metal and/or the metal-containing-compound can be recycled through the process enabling further ammonia to be converted to hydrogen.

The metal and/or metal-containing-compound and/or a precursor thereof may be stored in a remote reservoir and transferred to the reactor. Alternatively and/or additionally the metal and/or metal-containing-compound may be kept in the reactor.

The metal and/or the metal-containing-compound and/or a precursor thereof may be introduced into the reactor by pumping (preferably electromotively), volatizing/refluxing, spraying, or is mechanically introduced. Preferably, the metal and/or metal-containing-compound is introduced by electromagnetic pumping. It is thought that this method advantageously presents the cleanest reactive surface to the ammonia.

The metal and/or the metal-containing-compound and/or a precursor thereof may be introduced into the reactor in a solid, liquid or dispersed form, preferably at a temperature of from −240° C. to 800° C., more preferably at a temperature of from 0 to 800° C., more preferably at a temperature of from 100 to 700° C., more preferably at a temperature of from 150 to 600° C., or from 200 to 600° C., most preferably at a temperature of from 150 to 500° C., or from 220 to 450° C., or from 250 to 450° C., or from 350 to 500° C.

The method described herein may further comprise removing hydrogen formed by the reaction of ammonia with the metal and/or the metal-containing-compound from the reactor.

Preferably, the intermediate formed in step (i) is a stable, isolatable intermediate. The intermediate may be transferred from a first reactor, where it is formed, to a second reactor, where it is decomposed. Preferably, decomposition of the intermediate is endothermic, thus energy is required to initiate the decomposition.

Preferably, at least some of the intermediate formed in step (ii) is decomposed to form hydrogen and to regenerate at least some of the metal and/or the metal-containing-compound by electrochemical, thermal, microwave, mechanical, impact, combustion, detonation and/or ultrasound means, more preferably, by thermal means. For example, where intermediate formed in step (ii) is sodium amide (NaNH$_2$), the amide is molten at 230° C. and so may be pumped to a second chamber at temperatures of 230° C. and above. More preferably, where the intermediate formed in step (ii) is sodium amide (NaNH$_2$), the amide is molten at 250° C. and so may be pumped to a second chamber at temperatures of 250° C. and above.

The hydrogen formed from the decomposition of the intermediate is preferably transferred to a fuel cell and/or to a prime mover. Optionally the removed hydrogen may be passed through a filter to remove any ammonia present. The filter may be as described above.

When the intermediate is a metal amide, the decomposition reactions are thought to be as follows, for example:

$$MNH_2 \rightarrow M + \tfrac{1}{2}N_2 + H_2$$

$$MNH_2 \rightarrow MH + \tfrac{1}{2}N_2 + \tfrac{1}{2}H_2$$

$$M(NH_2)_2 \rightarrow M + N_2 + 2H_2$$

$$M(NH_2)_2 \rightarrow MH_2 + N_2 + H_2$$

$$M(NH_2)_3 \rightarrow M + 1\tfrac{1}{2}N_2 + 3H_2$$

$$M(NH_2)_3 \rightarrow MH_3 + 1\tfrac{1}{2}N_2 + 1\tfrac{1}{2}H_2$$

$$M(NH_2)_4 \rightarrow M + 2N_2 + 4H_2$$

$$M(NH_2)_4 \rightarrow MH_4 + 2N_2 + 2H_2$$

Other potential valences and/or mixed valences are possible. The skilled person would understand that the metal (M) may comprise one or more metals which may each have the same or different valence wherein the reactions are stoichiometrically balanced.

Preferably the method further comprises transferring at least some of the intermediate formed in a first reactor to a second reactor. In one embodiment the intermediate formed in the first reactor may be transferred into a second, third and/or subsequent reactor where it may be stored prior to decomposition.

Preferably the reaction of the metal and/or metal-containing compound and ammonia is carried out in an inert atmosphere. The inert atmosphere may comprise nitrogen, argon and/or helium.

Preferably the decomposition of the intermediate formed is carried out in an inert atmosphere. The inert atmosphere may comprise nitrogen, argon and/or helium.

The method and/or apparatus described herein may comprise one or more reactors in which intermediate formation and intermediate decomposition is carried out in the same reactor. Alternatively, and/or additionally, the method and/or apparatus described herein may comprise one or more first reactors and one or more second reactors, where the intermediate is formed in the one or more first reactors and is transferred to the one or more second reactors where it is decomposed.

As outlined above, step (iii) may be carried out in a second reactor, which is preferably isolatable from the first reactor.

The method described herein may further comprise transferring at least some of the regenerated metal and/or the regenerated metal-containing-compound from the second reactor to the first reactor.

In one embodiment of the present invention there is provided an apparatus for producing hydrogen from ammonia, the apparatus comprising:
  a reactor containing metal and/or a metal-containing-compound;
  a fuel source reservoir containing ammonia as a fuel;
    a flowline connecting the reservoir to the reactor for introducing the fuel into the reactor;
    an energy source coupled to the reactor arranged to input energy into the reactor in order to produce decomposition of intermediate formed in the reactor by reaction of the metal and/or a metal-containing-compound with ammonia; and a hydrogen outlet from the reactor for removing hydrogen from the reactor.

The apparatus may further comprise a hydrogen outlet which is connected to a fuel cell or a prime mover.

The apparatus described above may further comprise:
a reactor comprising a first reactor and a second reactor. (For example the reactor may comprise a first reactor unit and a second reactor unit).
a second flowline connecting the first and second reactor for transferring intermediate formed in the first reactor to the second reactor;
wherein the flowline connecting the reservoir to the reactor for introducing the fuel into the reactor is connected to the first reactor, so that ammonia can be introduced into the first reactor;
wherein the energy source arranged to input energy into the reactor in order to produce decomposition of intermediate, which is preferably a metal amide, formed in the first reactor by reaction of the metal and/or metal-containing-compound with ammonia is coupled to the second reactor;
wherein the hydrogen outlet is connected to the second reactor for removing hydrogen from the reactor;
the apparatus further comprising a recycle flow line from the second reactor to the first reactor for transferring metal and/or the metal-containing-compound regenerated from the decomposition of the intermediate to the first reactor.

Preferably one or both hydrogen outlets are connected to a fuel cell or a prime mover.

It will be understood that the steps outlined in the described method and apparatus may be carried out in any suitable order.

The present invention has number of advantages which are outlined below.

The metal and/or metal-containing compound which reacts with ammonia to form an intermediate is reformed upon decomposition of the intermediate, thus it may be recycled in the process.

Preferably, the intermediate is formed in an exothermic reaction with ammonia and the metal and/or metal-containing compound. This means that the start-up time (i.e. time to get the system up to operating temperature) is kept low since the reaction itself provides heat. Furthermore, preferably this reaction evolves hydrogen (preferably 0.5-1.0 $H_2$ molecules (depending on the nature of the metal and/or metal-containing compound) which may be used in the fuel cell to create electrical energy. This electrical energy may then be used to further heat the intermediate to decomposition or provide electrical energy to the vehicle for fast start-up.

Advantageously, the proposed system is simple, relying on a two step reaction for the evolution of hydrogen and optionally nitrogen.

The process described herein is energy efficient. Thermodynamic calculations show that the reaction of ammonia, with a metal and/or metal containing compound (preferably sodium), and the subsequent decomposition of the intermediate formed (preferably sodium amide), is almost thermally neutral when the pre-evolved $0.5-1.0H_2$ is passed through a fuel cell and the resulting electrical energy utilised to heat the intermediate.

It is advantageous to use sodium metal in the present invention as it is a cheap and abundant metal of considerably reduced cost compared to traditional ammonia cracking catalysts such as ruthenium.

Most solid-state hydrogen storage systems rely on the bulk storage of a complex hydride. In the described process the hydrogen storage medium is ammonia (~18 wt %) which is reacted with a limited mass of a metal and/or metal containing compound, which, being reformed as part of the decomposition process, may be subsequently reacted with additional ammonia to produce hydrogen. This process is preferably not a catalytic process but a two step process where the metal and/or metal containing compound is a reactant. In the described process the weight and volume of the reactor may be reduced over known reactors since only relative small masses of metal and/or metal containing compounds and ammonia need to be combined at any one instance. A reactor capable of reacting 1 kg of metal and/or metal containing compound (when the metal and/or metal containing compound=Na) with approximately 740 g of ammonia will be sufficient to provide 65 g of $H_2$. However, with the reformation of the metal and/or metal containing compound, the same amount of hydrogen may be evolved by performing the same reaction 5 times with 200 g of metal and/or metal containing compound. Such a reactor may be much smaller and lighter than a 1 kg reactor. Indeed, the smaller the mass of the metal and/or metal containing compound, the easier and faster it may be cycled. Thus any vehicle based system will have a reactor size, and number, related to the required hydrogen for the fuel cell/power train of the vehicle.

These and other aspects of the invention will now be described with reference to the accompanying Figures, in which:

FIG. 1: is a schematic diagram of the process according to the present invention.

Figure 2:
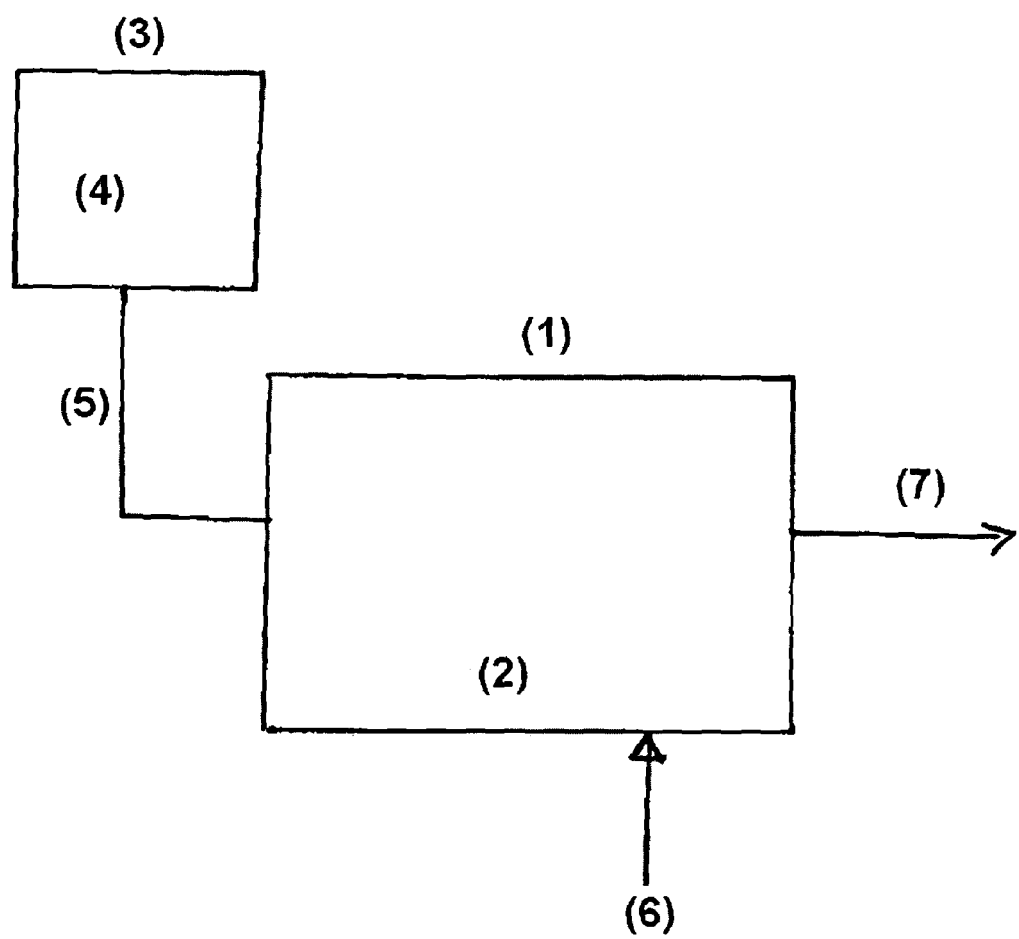

FIG. 2: is a schematic diagram of an apparatus for carrying out an embodiment of the process of the present invention. In this embodiment only one reactor is used in the hydrogen production.

Figure 3:
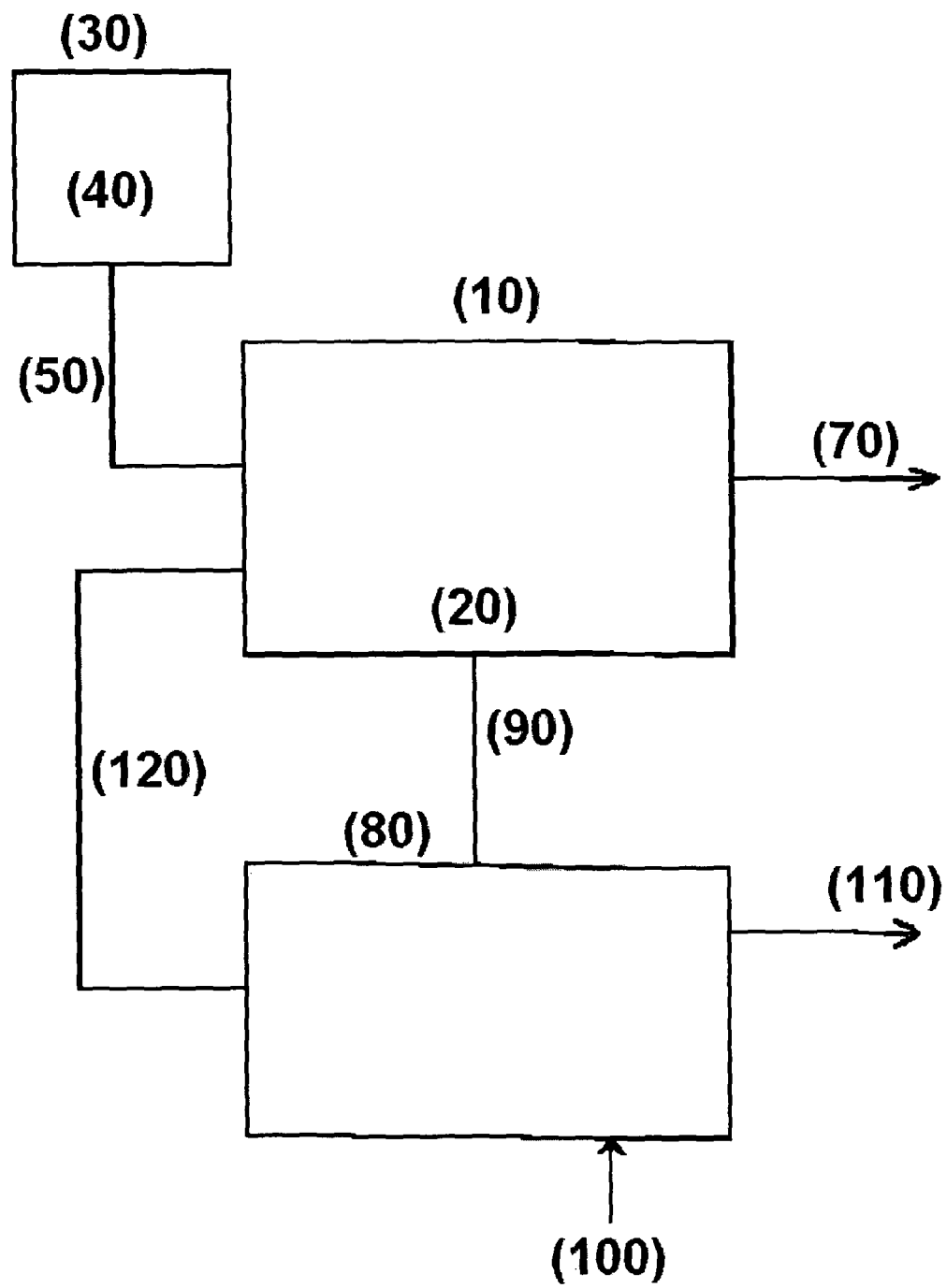

FIG. 3: is a schematic diagram of an apparatus for carrying out an embodiment of the process of the present invention. In this embodiment two reactors are used in the hydrogen production. In the first reactor the intermediate, preferably a metal amide is formed. The intermediate is then transferred to a second reactor where the intermediate is decomposed to release hydrogen and to regenerate the metal and/or the metal-containing compound.

Figure 4:
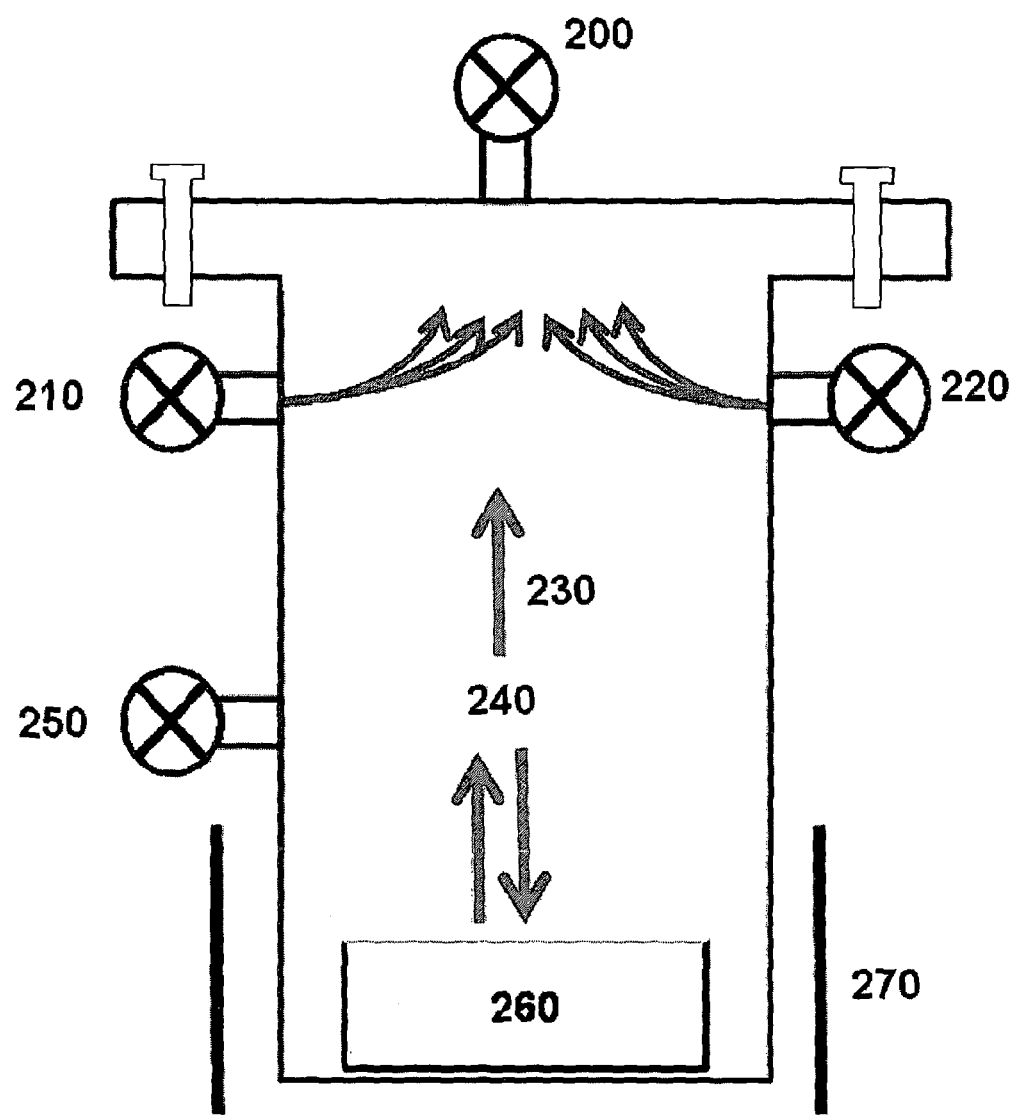

FIG. 4: is a schematic diagram of a reactor for carrying out the process of the present invention. In this embodiment only one reactor is used in the hydrogen production.

Figure 5:
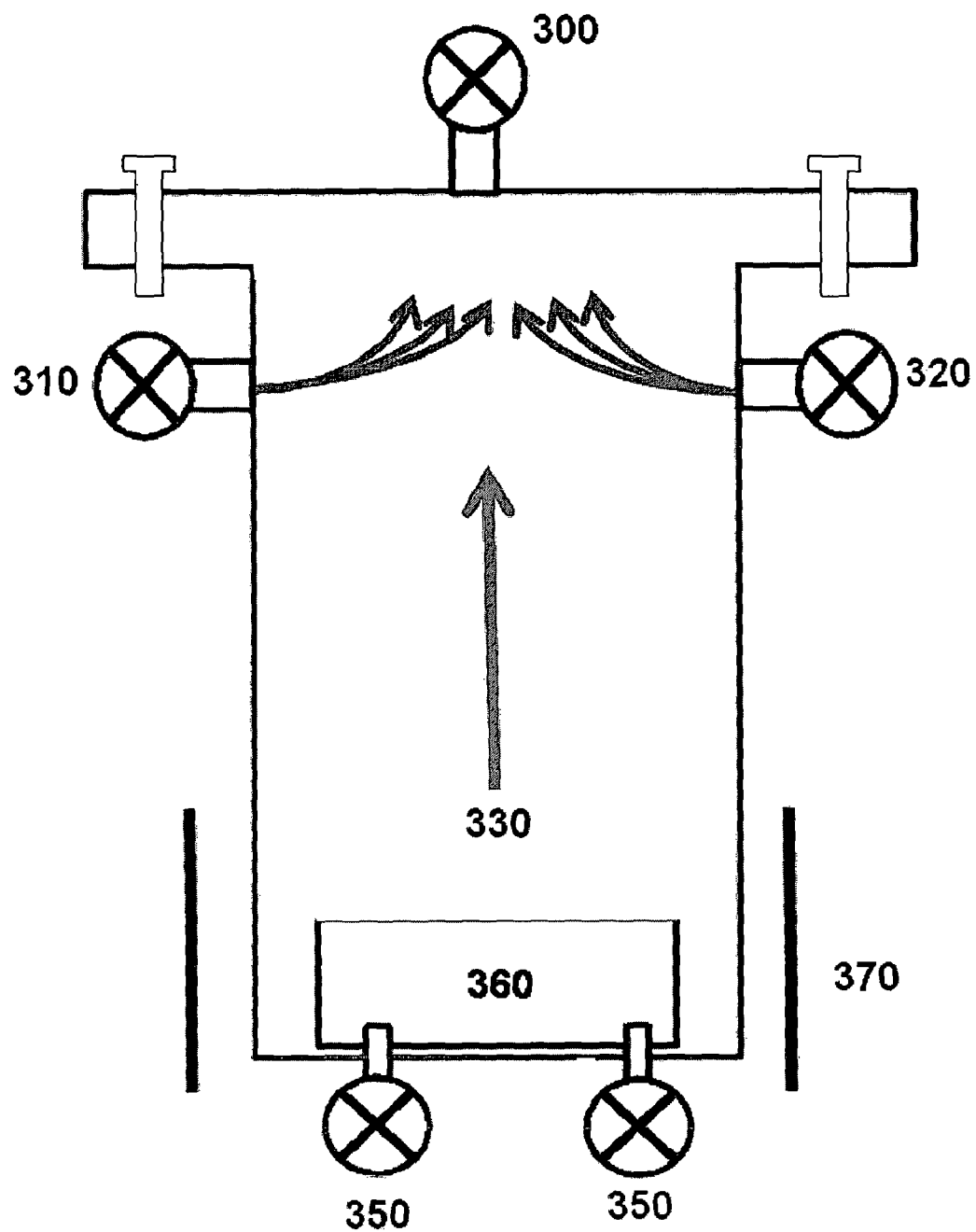

FIG. 5: shows an alternative design of a reactor where ammonia is fed through the molten sodium.

Figure 6:
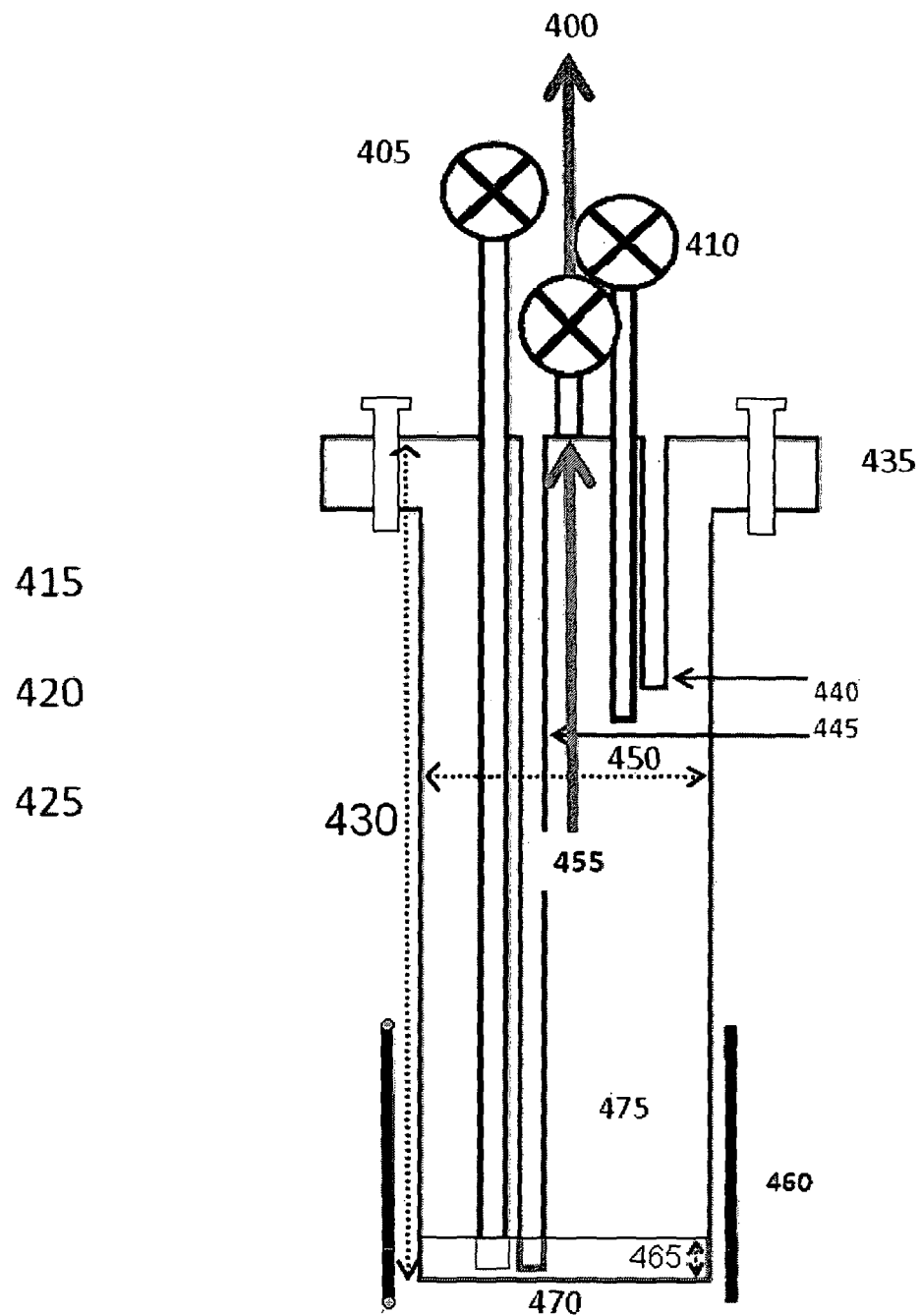
Figure 7:
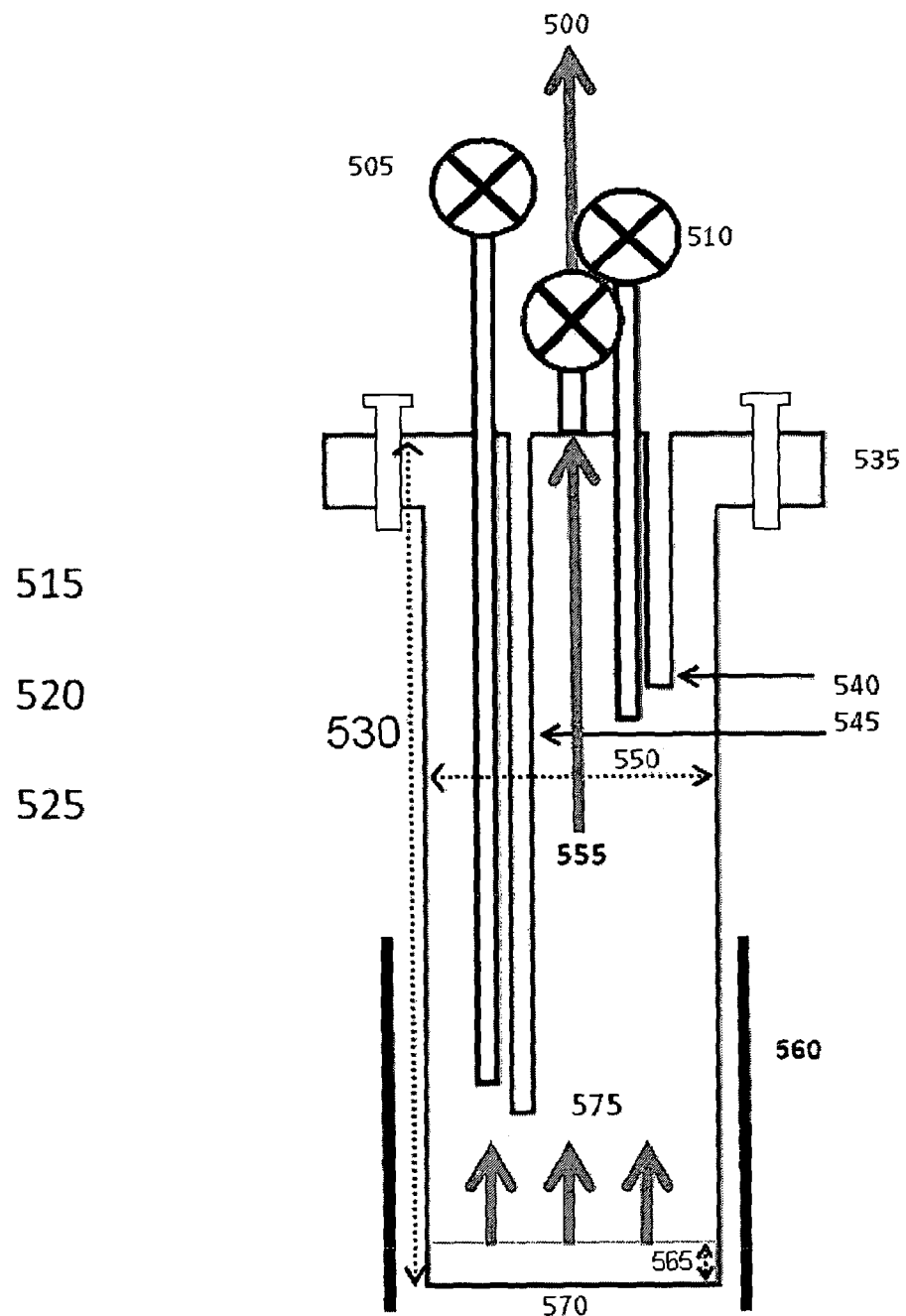

FIGS. 6 and 7: are schematic diagrams of reactors for carrying out an embodiment of the process of the present invention. In these embodiments only one reactor is used in the hydrogen production.

Figure 8:
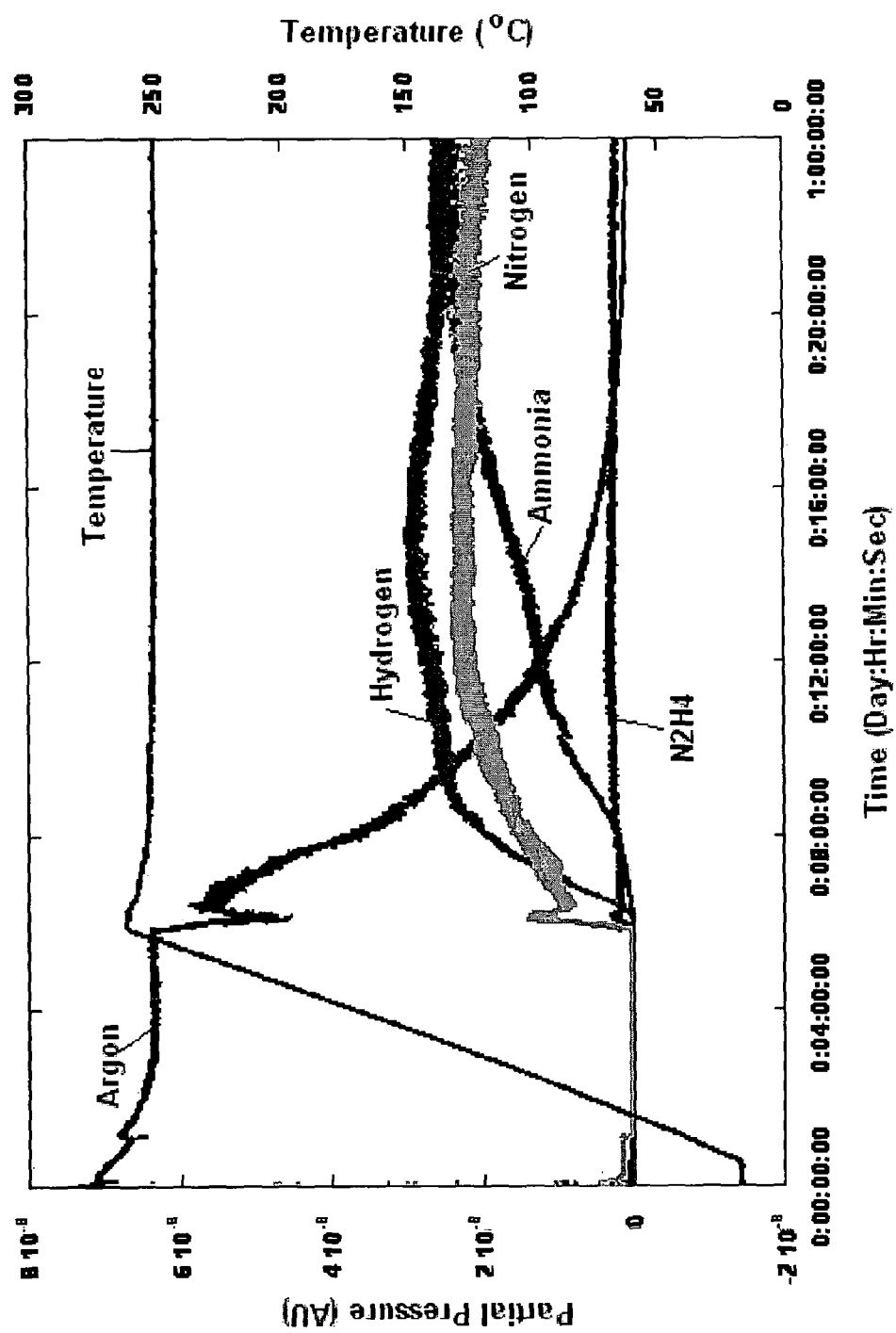

FIG. 8: is a graph showing the incomplete conversion of ammonia to nitrogen and hydrogen at 250° C., ammonia flow rate 10 sccm.

Figure 9:
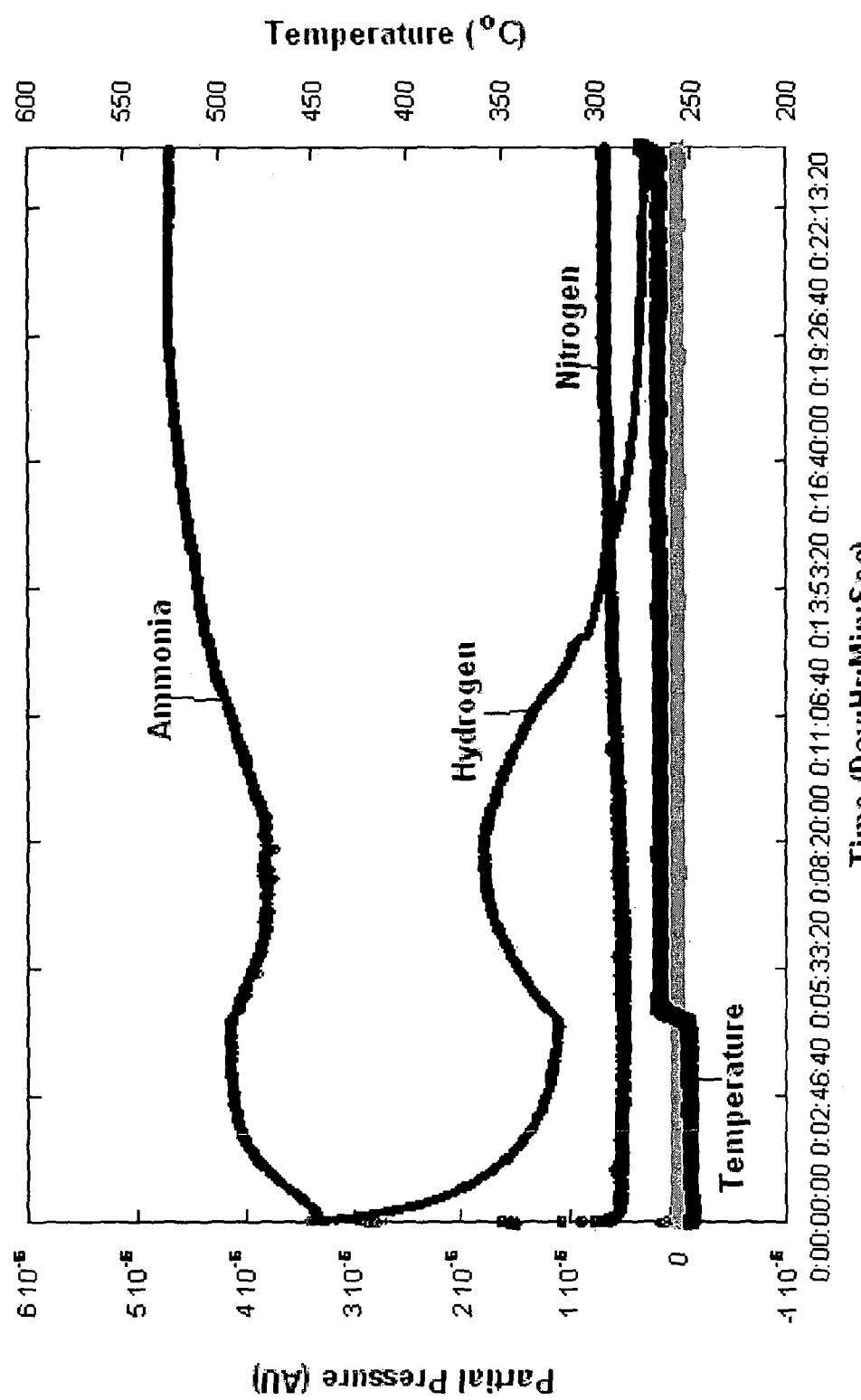

FIG. 9: is a graph showing that increasing the flow of ammonia to 40 sccm decreases the relative partial pressure of nitrogen and hydrogen.

Figure 10:
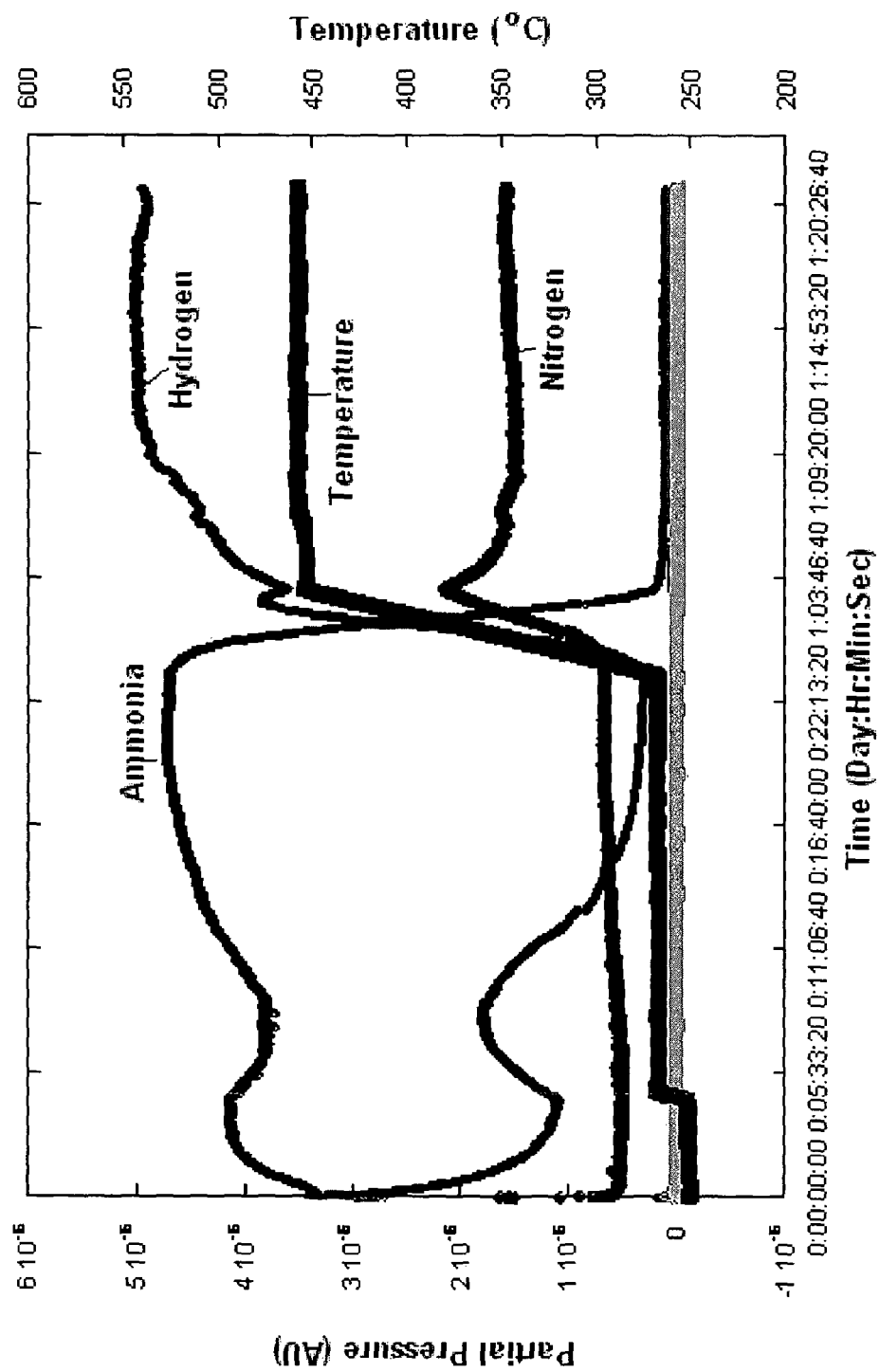

FIG. 10: is a graph showing that when the temperature is raised to 450° C., total conversion of ammonia to nitrogen and hydrogen may be observed.

Figure 11:
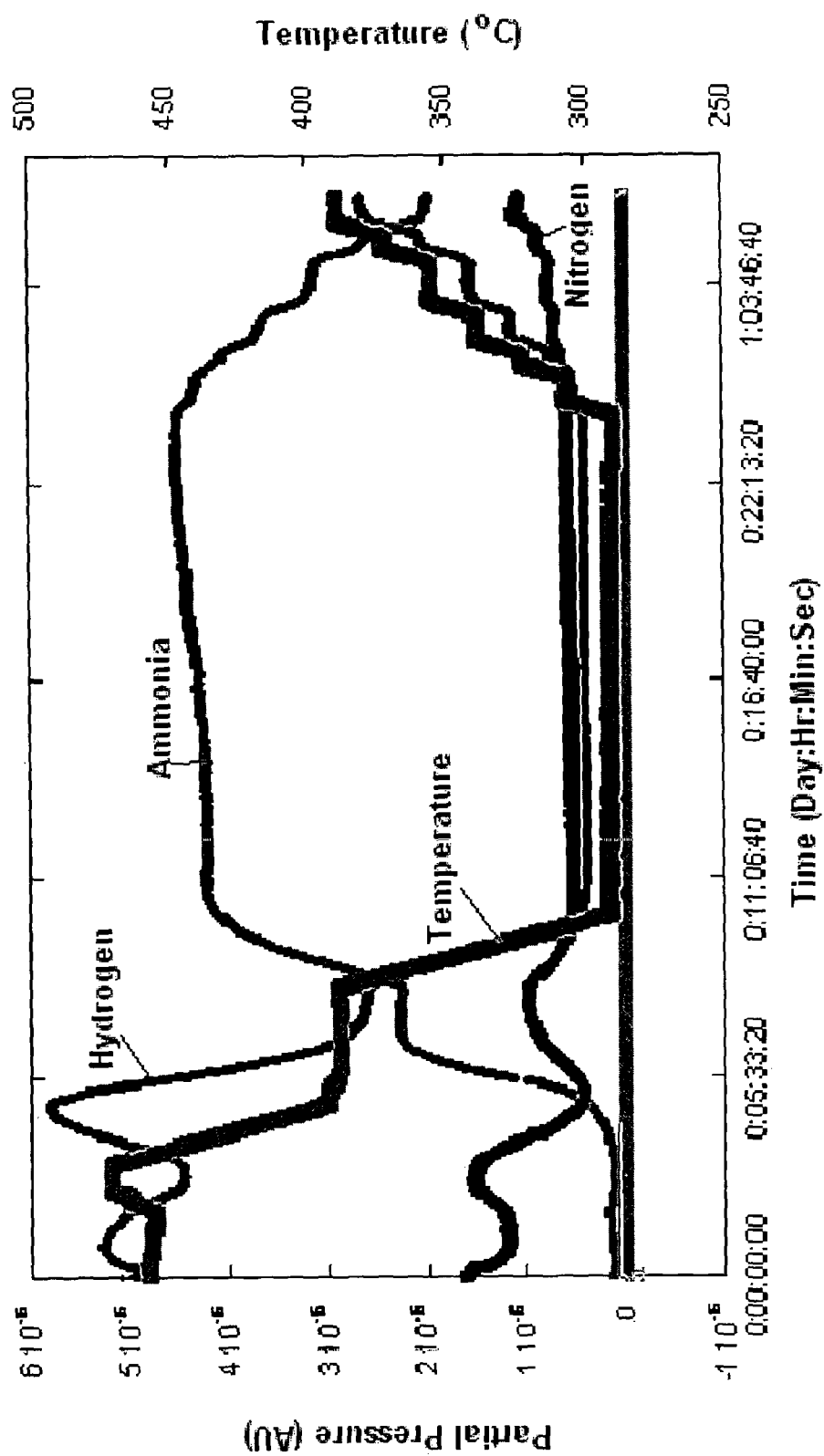

FIG. 11: is a graph showing that the rate of ammonia conversion to nitrogen and hydrogen may be controlled through temperature.

Figure 12:
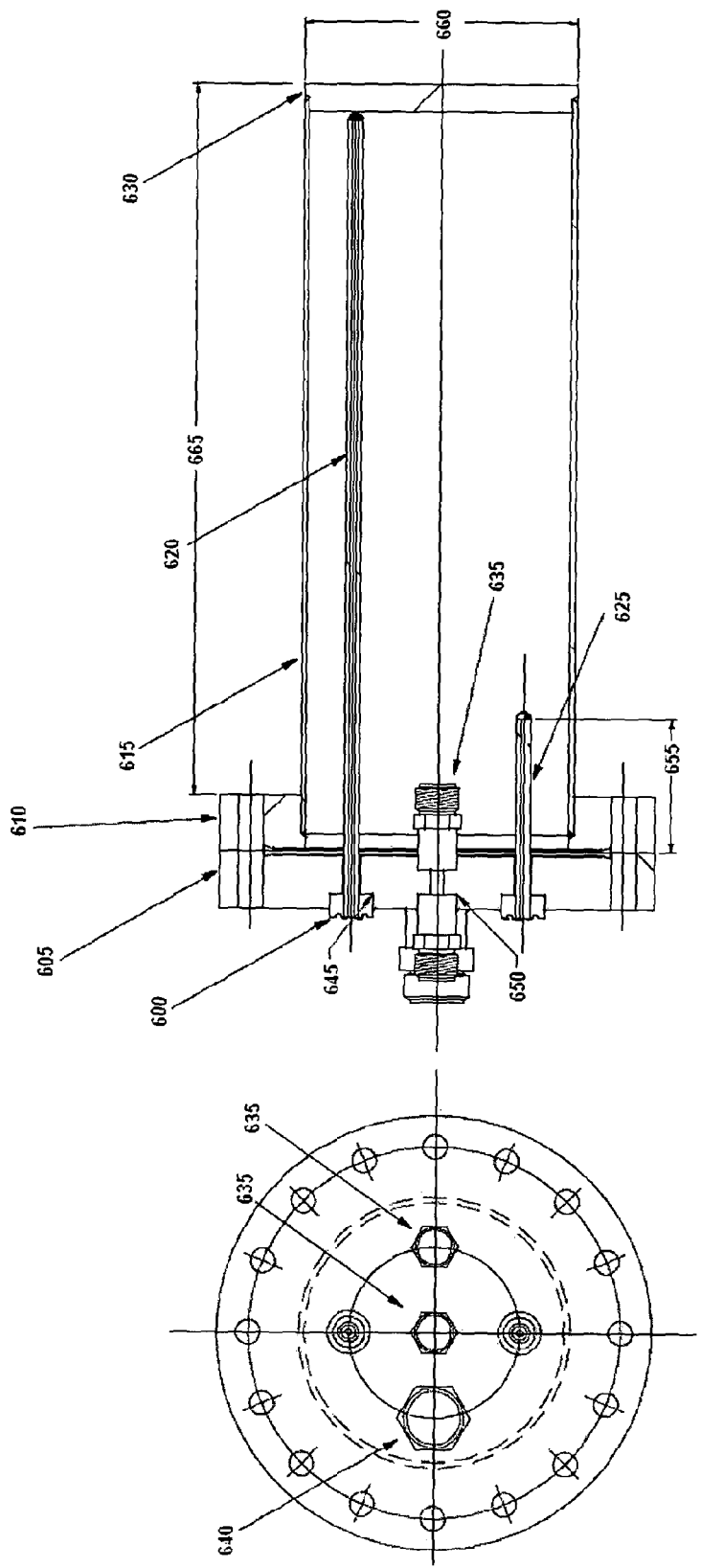
Figure 13:
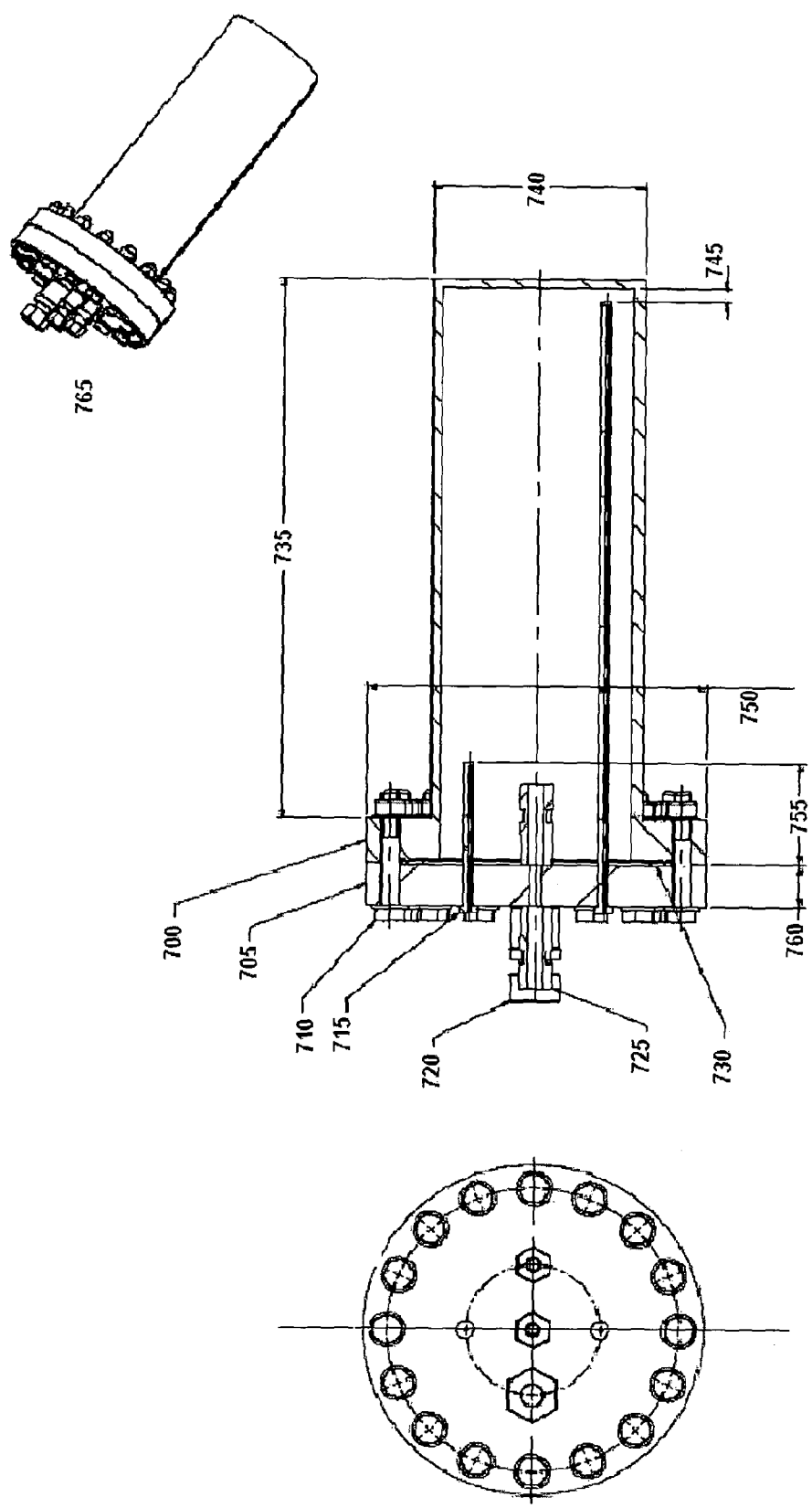
Figure 14:
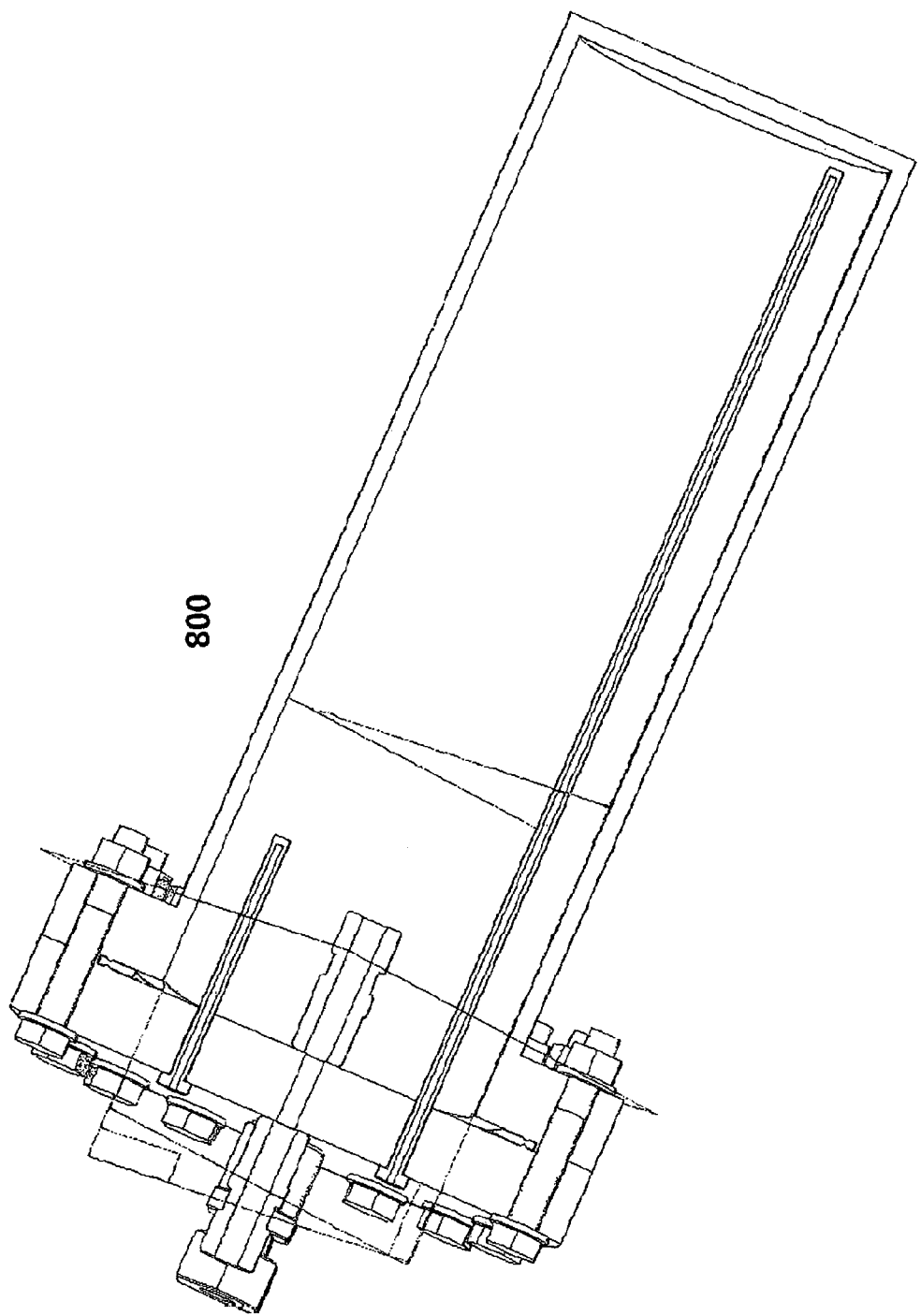

FIGS. 12, 13 and 14: are cross-sectional diagrams of a reactor for carrying out an embodiment of the present invention. In these embodiments only one reactor is used in the hydrogen production.

As outlined above, FIG. 2 is a schematic diagram of an apparatus for carrying out an embodiment of the process of the present invention. In this embodiment only one reactor is used in the hydrogen production.

The apparatus comprises a reactor (1) containing metal and/or a metal-containing-compound (2); a fuel source reservoir (3) containing ammonia (4) as a fuel. A flowline (5) connects the reservoir (3) to the reactor (1) for introducing the fuel into the reactor (1). An energy source (6) is coupled to the reactor (1) and is arranged to input energy into the reactor (1) in order to produce decomposition of intermediate formed in the reactor (1) by reaction of the metal and/or a metal-containing-compound (2) with ammonia (4). The apparatus also comprises a hydrogen outlet (7) from the reactor (1) for removing hydrogen from the reactor (1).

Optionally an additional flowline may be provided into reactor (1) for introducing the metal and/or a metal-containing-compound into the reactor (1).

As outlined above, FIG. 3 is a schematic diagram of an apparatus for carrying out an embodiment of the process of the present invention. In this embodiment two reactors are used in the hydrogen production. In the first reactor (10) the intermediate, preferably a metal amide is formed. The intermediate is then transferred to a second reactor (80) where the intermediate is decomposed to release hydrogen and to regenerate the metal and/or the metal-containing compound.

In FIG. 3 the apparatus comprises a first reactor (10) containing metal and/or a metal-containing-compound (20) and a second reactor (80). A fuel source reservoir (30) containing ammonia (40) as a fuel is connected to reactor (10) by a flowline (50) for introducing the fuel into the reactor (10) in order to produce the reaction of the ammonia (40) and the metal and/or a metal-containing-compound (20) to form the intermediate, which is preferably a metal amide. The apparatus optionally comprises a hydrogen outlet (70) from the reactor (10) for removing hydrogen from the reactor (10). A second flowline (90) connects the first (10) and second reactor (80) for transferring intermediate formed in the first reactor (10) to the second reactor (80). The energy source (100) is arranged to input energy into the reactor (80) in order to produce decomposition of the intermediate, which is preferably a metal amide, formed in the first reactor (10) by reaction of the metal and/or metal-containing-compound (20) with ammonia (40). At least one hydrogen outlet (110) is connected to the second reactor (80) for removing hydrogen from the reactor (80). The apparatus further comprises a recycle flowline (120) from the second reactor (80) to the first reactor (10) for transferring metal and/or the metal-containing-compound regenerated from the decomposition of the intermediate to the first reactor (10).

Optionally an additional flowline may be provided into reactor (10) for introducing the metal and/or a metal-containing-compound into the reactor.

Optionally an additional energy source may be coupled to the first reactor (10) and arranged to input energy into the first reactor (10).

FIG. 4 shows a schematic diagram of a reactor for carrying out an embodiment of the process of the present invention. In this embodiment only one reactor is used in the hydrogen production. In this embodiment sodium (260) is placed in the reactor. Ammonia gas is introduced via flowline (250). Cool nitrogen may be introduced via flowline (210) and/or (220). An energy source (270), which may be for example a furnace, heater, electromagnetic pump and/or electrochemical cell is arranged to input energy into the reactor. Sodium vapour (240) may be produced from molten sodium which reacts with the ammonia. An intermediate is formed which decomposes to provide nitrogen and hydrogen (230) and the sodium is recycled to react with further ammonia. Hydrogen is removed via flowline 200. The hydrogen removed may be transferred to a mass spectrometry machine for detecting hydrogen and any ammonia present.

Preferably the reactor is operated at a temperature of from 150 to 500° C., or from 220° C. to 500° C., or from 250 to 500° C.

FIG. 5 shows an alternative design of a reactor where ammonia is fed through the molten sodium. Such a design may be preferred as it allows a higher intermediate formation:$NH_3$ ratio to be formed and reduces or potentially eliminates the problem of surface tarnishing of the molten sodium. It may also simplify the reactor design.

Preferably, the ammonia in-pipe has a swan neck or straight ammonia feed line that lies below the surface level of the liquid metal M, to keep the sodium molten within the hot zone but allow ammonia to bubble through the molten sodium. In this embodiment sodium (360) is placed in the reactor.

Ammonia gas is introduced via flowline (350). Cool nitrogen may be introduced via flowline (310) and/or (320). An energy source (370), which may be for example a furnace, heater, electromagnetic pump and/or electrochemical cell is arranged to input energy into the reactor. An intermediate is formed which decomposes to provide nitrogen and hydrogen (330) and the sodium is recycled to react with further ammonia. Hydrogen is removed via flowline 300. The hydrogen removed may be transferred to a mass spectrometry machine for detecting hydrogen and any ammonia present.

Preferably the reactor is operated at a temperature of from 150 to 500° C., or from 220 to 500° C., or from 250 to 500° C.

The key for FIG. 6 is given below:
400: To mass spec detecting $N_2$, $H_2$ and $NH_3$
405: Hot ammonia gas (Furnace temperature) Inlet
410: Cool $N_2$ in
415: 316 stainless
420: 18.54 g (20 cm$^3$) molten sodium
425: RT (room temperature) to 800° C., 0.1 MPa $NH_3/N_2$
430: 300 mm
435: Cu gasket
440: Thermocouple
445: Wells
450: 100 mm
455: $N_2$ and $H_2$
460: External Tube Furnace
465: 20 mm
470: Molten sodium
475: Na Vapour The key for FIG. 7 is given below:
500: To mass spec detecting $N_2$, $H_2$ and $NH_3$
505: Hot ammonia gas (Furnace temperature) Inlet
510: Cool $N_2$ in
515: 316 stainless
520: 18.54 g (20 cm$^3$) molten sodium
525: RT to 800° C., 0.1 MPa $NH_3/N_2$
530: 300 mm
535: Cu gasket
540: Thermocouple
545: Wells
550: 100 mm
555: $N_2$ and $H_2$
560: External Tube Furnace
565: 20 mm 570: Molten sodium
575: Na Vapour The key for FIG. 12 is given below:

600: Thermal Couple Housing
605: 100 CF Top Blank
610: 100 CF Furnace Vessel Flanges
615: Large Furnace Tube (258.5 mm long)
620: Long Thermal Couple Pocket (280 mm long)
625: Short Thermal Couple Pocket (70 mm long)
630: Furnace Base
635: Parker Buttweld
640: Parker Buttweld
645: Minimise Trapped Volumes
650: Flush Fit to Minimise Trapped Volumes
655: 47.0 mm
660: Φ95.0 mm
665: 250.0 mm The key for FIG. 13 is given below:

700: Details AS DN100 CF Flange
705: Details AS DN100 CF Flange
710: M8×55 Hex Bolts
715: 2 Off Welded in Thermocouple pockets for Top and Bottom Level Sensing. Internal Diameter 1.8 mm
720: Parker Hannifin ZHBW2 6½ Buttweld Connector
725: Parker Hannifin ZHBW2 4½ Buttweld Connector. 3 Off.
730: DN100 CF Copper Gasket
735: 250 mm
740: Φ95 mm
745: 5 mm
750: Φ152 mm
755: 47 mm
760: 20 mm
765: Reactor The key for FIG. 14 is given below:

800: Reactor

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The following non-limiting example further illustrates the present invention.

EXAMPLE 1

A stainless steel reactor (100 mm OD, 300 mm in height) is pre-loaded with 18.54 g (20 cm³ when liquid) of pristine sodium metal in an inert (N2, Ar or He) atmosphere. The reactor is isolated from the atmosphere and connected to a gas handling panel and then evacuated to a pressure of 0.6-1 kPa. The sodium may be cleaned/pre-reacted in 100 kPa flowing (60 sccm (Standard Cubic Centimeters per Minute)) hydrogen gas at 300° C. to reduce the surface of the sodium metal and/or create NaH for reaction initiation on the surface of the sodium metal, although this step is not essential. If the system is pre-treated with hydrogen, the apparatus is then evacuated again to a pressure of 0.6-1 kPa before the introduction of ammonia. The bottom half of the reactor is then heated to 500° C. and the top half continuously flushed with room temperature, high purity, dry nitrogen buffer gas (100 kPa). A 1 cm³/sec (60 sccm) flow of high purity, dry ammonia gas (H2O<1 ppm), controlled by a mass flow controller, is heated to 500° C. and then delivered into the sodium reactor either into the volatilised vapour of sodium above the molten metal (Reactor 1) or below the level of the liquid sodium and bubbled through the liquid sodium (Reactor 2). The ammonia and sodium react, resulting in the formation of NaNH2, which then decomposes to produce Na metal (which is returned to the molten reservoir), N2 and H2 according to Equations 1, 2, 2a and 2b.

$$2NH_3 + 2Na = 2NaNH_2 + H_2 \qquad \text{Equation 1}$$

$$2NaNH_2 = 2Na + N_2 + 2H_2 \qquad \text{Equation 2}$$

$$2NaNH_2 = 2NaH + N_2 + H_2 \qquad \text{Equation 2a}$$

$$2NaH = 2Na + H_2 \qquad \text{Equation 2b}$$

Equations 2 and 2a may occur in competition, but at the temperature of reaction (500° C.) both occur spontaneously, as does Equation 2b.

H2 is evolved at a rate of 1.5 times the flow rate of ammonia (thus 90 sccm) and N2 evolved at the same rate as the flow rate of ammonia (60 sccm). Reaction will continue at this rate for as long as the ammonia feed stock is added at a rate of 60 sccm. The rate of H2 and N2 production varies linearly with the rate of addition of ammonia.

EXAMPLE 2

A mass of precursor material(s) (Na, NaH, NaNH2 or some combination thereof) is loaded, under inert atmosphere, into the reactor which is then sealed and connected to an inert gas supply. Inert gas (typically Ar) is flowed through the reactor to maintain the inert atmosphere within the reactor and over the precursor material(s). The precursor materials may be heated under inert atmosphere to decompose them and create a pristine Na metallic surface for reaction. Alternatively, where an appropriate mixture of Na, NaH and NaNH2 is used the decomposition step is not necessary. When a pristine Na surface has been produced, the sample is heated under flowing inert atmosphere or under flowing NH3 atmosphere until the appropriate temperature for hydrogen generation has been reached. This temperature is between 100 and 800° C., preferably between 100 and 500° C. and optimally between 150 and 450° C. Flow rates of Ar and/or NH3 between 1 sccm and 500 sccm are appropriate depending on the flow of hydrogen required.

The reaction corresponds to the creation and decomposition of NaNH2, evolving hydrogen. The evolution of hydrogen begins after the evolution of nitrogen which suggests that hydrogen evolved in the initial reaction/decomposition of ammonia is trapped by metallic sodium. Once the temperature plateaus, the rate of nitrogen evolution also plateaus.

As the temperature is lowered, hydrogen and nitrogen continue to be evolved but if the temperature is lowered sufficiently, not all of the ammonia is converted and the concentration of ammonia in the exhaust flow increases. The conversion or partial conversion of ammonia to nitrogen and hydrogen depends on i) the mass of Na/NaH, NaNH2 reactant ii) the flow rate of ammonia and iii) the temperature.

The reactor is then flushed with argon and allowed to cool. Once at room temperature, the reactor is heated to between 250° C. and 260° C. under argon and, once at temperature, exposed to a flow of 10 sccm ammonia. As soon as the ammonia is introduced (at a temperature corresponding to ~260° C.) the evolution of N2 is observed, followed shortly after by the evolution of N2H4 and subsequently H2.

FIG. 8 shows the incomplete conversion of ammonia to nitrogen and hydrogen at 250° C., ammonia flow rate 10 sccm.

The flow rate is then increased to 40 sccm and a decrease in the partial pressure of nitrogen and hydrogen is observed (at time=0, FIG. 9), consistent with the increased concentration of ammonia. The temperature is slightly increased and only the hydrogen signal is seen to increase, which suggests an increase in the rate of formation of amide with respect to the rate of decomposition FIG. 9 shows that increasing the flow of ammonia to 40 sccm decreases the relative partial pressure of nitrogen and hydrogen. The subsequent increase in temperature causes an increase in rate of amide formation with respect to the rate of decomposition and thus a gradual conversion of the material to the amide.

The temperature is then raised to 450° C. and the total conversion of ammonia to nitrogen and hydrogen is observed (FIG. 10). This conversion continues for as long as the flow and temperature remains constant.

FIG. 11 shows the influence of temperature. As the temperature is lowered, the rate of amide formation increases above that of amide decomposition, and the partial pressure of hydrogen increases, while that of nitrogen decreases. The ammonia concentration also increases which indicates the relative rates of the two processes and the amount of Na/NaH available for conversion to amide. Conversion of ammonia to nitrogen and hydrogen continues even below 300° C., but at a rate insufficient to convert all the incoming ammonia. As the temperature is raised, the rate of amide decomposition/ammonia conversion increases accordingly.

FIGS. 8 to 11 show that:
1) Ammonia may be converted to nitrogen and hydrogen, for example within the temperature range of 220-450° C.
2) The total conversion efficiency of ammonia is thought to be dependent on mass of reactants, ammonia flow rate, temperature and the position of the Na/NaH/NaNH$_2$ reactants within the reactor and with respect to the ammonia flow. Without wishing to be bound by any particular theory, temperature is thought to be the most significant variable in controlling the rate of ammonia conversion, as expected for exothermic (Na/NaH+NH$_3$→NaNH$_2$+0.5/1.0H$_2$) and endothermic (NaNH$_2$→Na+0.5N$_2$+H$_2$) processes, with higher temperatures favouring the endothermic process and thus increasing the conversion rate. At no stage is the temperature too high to prevent the formation of amide.
3) Preferably, conversion of ammonia continues without abatement once the process has begun as long as ammonia continues to flow. Changing the temperature may change the rate of those processes. There does not appear to be any reduction in the ability of the system to convert ammonia as a function of time.
4) The system may be cooled and heated, even with gas changes, without any impairment to its ability to convert ammonia.

The invention claimed is:

1. A method of producing hydrogen from ammonia the method comprising:
   (i) providing ammonia as a fuel source;
   (ii) introducing ammonia into a reactor and reacting at least some of the ammonia with a metal and/or a metal-containing-compound to form at least one intermediate and optionally hydrogen;
   (iii) decomposing at least some of the intermediate produced in step (ii) to form hydrogen and to regenerate the metal and/or the metal-containing-compound;
   (iv) removing at least some of the hydrogen formed in step (iii); and
   (v) reacting the regenerated metal and/or the regenerated metal-containing-compound with further ammonia;
   wherein the metal and/or the metal-containing-compound comprises or is selected from the group consisting of Group I metals;
   wherein the Group I metal is selected from the group consisting of Na, Li, K, Rb, Cs, alloys and mixtures of two or more thereof;
   wherein the reaction of the at least some ammonia with the metal and/or the metal-containing-compound to form the at least one intermediate is carried out at a temperature in the range of from 450 to 800° C. and at a pressure of 0.01 to 20 MPa.

2. The method according to claim 1 wherein the method is carried out in-situ in a vehicle.

3. The method according to claim 1 further comprising introducing the removed hydrogen into a fuel cell or a prime mover.

4. The method according to claim 1 further comprising combusting the removed hydrogen.

5. The method according to claim 1 wherein the at least one intermediate is a stable, isolatable intermediate.

6. The method according to claim 1 wherein the at least one intermediate is a metal amide.

7. The method according to claim 1 further comprising refuelling the ammonia fuel source.

8. The method according to claim 1 wherein the Group I metal is Na.

9. The method according to claim 1 wherein the reaction of the at least some ammonia with a metal and/or metal containing compound to form at least one intermediate is carried out in the presence of a catalyst.

10. The method according to claim 9 wherein the catalyst comprises one or more transition metals, lanthanide metals and mixtures thereof.

11. The method according to claim 10 wherein the catalyst is selected from the group consisting of transition metal calogenides, lanthanide metal calogenides, transition metal halides, lanthanide metal halides, transition metal pnictides, lanthanide metal pnictides, transition metal tetrels, lanthanide metal tetrels and mixtures of two or more thereof.

12. The method according to claim 1 wherein the at least some ammonia is introduced into the reactor such that the molar ratio of ammonia to metal and/or metal-containing-compound is in the range of from 1:1 to 1:2.

13. The method according to claim 1 further comprising removing hydrogen formed by the reaction of ammonia with the metal and/or the metal-containing-compound from the reactor.

14. The method according to claim 1 wherein at least some of the intermediate formed in step (ii) is decomposed to form hydrogen and to regenerate at least some of the metal and/or the metal-containing-compound by electrochemical, thermal, microwave, mechanical, impact, combustion, detonation and/or ultrasound means.

15. The method according to claim 1 wherein hydrogen is provided at the point of use or into a distributed network.

16. A method of producing hydrogen from ammonia the method comprising:
   (i) providing ammonia as a fuel source;
   (ii) introducing ammonia into a reactor and reacting at least some of the ammonia with a metal and/or a metal-containing-compound to form at least one intermediate and optionally hydrogen;
   (iii) decomposing at least some of the intermediate produced in step (ii) to form hydrogen and to regenerate the metal and/or the metal-containing-compound;

(iv) removing at least some of the hydrogen formed in step (iii); and
(v) reacting the regenerated metal and/or the regenerated metal-containing-compound with further ammonia; and
wherein the reaction of the at least some ammonia with a metal and/or metal containing compound to form at least one intermediate is carried out in the presence of a catalyst; and
wherein the catalyst is selected from the group consisting of transition metal calogenides, lanthanide metal calogenides, transition metal halides, lanthanide metal halides, transition metal pnictides, lanthanide metal pnictides, transition metal tetrels, lanthanide metal tetrels and mixtures of two or more thereof.

* * * * *